(12) United States Patent
Brodeur et al.

(10) Patent No.: US 8,611,586 B1
(45) Date of Patent: Dec. 17, 2013

(54) FAST TARGET EXTRACTION FROM THERMAL IMAGERY

(75) Inventors: Kenneth Michael Brodeur, Webster, NY (US); Eric August Woodward, Rochester, NY (US); Theodore Anthony Tantalo, Rochester, NY (US); Timothy Paul Hahm, Hilton, NY (US)

(73) Assignee: Exelis, Inc., McLean, VA (US)

( * ) Notice: Subject to any disclaimer, the term of this patent is extended or adjusted under 35 U.S.C. 154(b) by 448 days.

(21) Appl. No.: 12/949,965

(22) Filed: Nov. 19, 2010

(51) Int. Cl.
*G06K 9/00* (2006.01)

(52) U.S. Cl.
USPC .......................................... 382/100; 382/168

(58) Field of Classification Search
None
See application file for complete search history.

(56) References Cited

U.S. PATENT DOCUMENTS

| | | | |
|---|---|---|---|
| 7,138,905 B2 * | 11/2006 | Pavlidis et al. | 340/5.81 |
| 2002/0172410 A1 * | 11/2002 | Shepard | 382/141 |
| 2004/0061777 A1 * | 4/2004 | Sadok | 348/83 |

OTHER PUBLICATIONS

Conaire, C.O.; Cooke, E.; OConnor, N.; Murphy, N.; Smearson, A., "Background Modelling in Infrared and Visible Spectrum Video for People Tracking," Computer Vision and Pattern Recognition—Workshops, 2005. CVPR Workshops. IEEE Computer Society Conference on, vol., no., pp. 20,20, 25-25 Jun. 2005.*

Gonzales, Rafael C., and Woods, Richard E., "Digital Image Processing; Second Edition", Prentice Hall, New Jersey, p. 598-600, 2002.

* cited by examiner

*Primary Examiner* — Claire X Wang
*Assistant Examiner* — Thomas A James
(74) *Attorney, Agent, or Firm* — RatnerPrestia

(57) ABSTRACT

A method for extracting a target from a series of images includes the steps of: (a) estimating an ambient temperature value of pixels in the series of images; (b) finding a band of pixel values having temperature values above the ambient temperature value, the band of pixel values forming a histogram; and (c) differentiating the histogram to estimate a threshold. Also included are steps (d) extracting the target having pixel values above the threshold; and (e) colorizing the target for display.

16 Claims, 18 Drawing Sheets

$$\alpha_1 = |\mu_{amb_i} - \mu_{ambient_{old}}|$$

$$\alpha_2 = |\mu_{ambient} - \mu_{ambient_{old}}|$$

FIG. 1c

INITIAL STATE $\mu_{ambient}$ considered "unstable"

$\alpha_{amb} = \alpha_{ambSHORT}$ if $\mu_{ambient}$ considered "unstable"

if $|\mu_{ambient} - \mu_{ambient_{old}}| < \Delta\mu_f$ for $F_{stable}$ consecutive frames $\mu_{ambient}$ considered "stable"

Transition $\alpha_{amb}$ from $\alpha_{ambSHORT}$ to $\alpha_{ambLONG}$ OVER $F_{trans}$ frames End ElseIF $\mu_{ambient}$ considered "stable"

if $|\mu_{ambient} - \mu_{ambient_{old}}| > \Delta\mu_i$ for $F_{unstable}$ consecutive frames $\mu_{ambient}$ considered "unstable"

Transition $\alpha_{amb}$ from $\alpha_{ambLONG}$ to $\alpha_{ambSHORT}$ OVER $F_{trans}$ frames End EndIf

FIG. 2

$\Delta\tau_{hist} = \tau_{hist_{new}} - \tau_{hist_{old}}$ if $\Delta\tau_{hist} > 0$ (positive shift in $\tau_{hist}$)

$\quad \tau_{hist'} = \min(\tau_{hist_{new}}, \tau_{hist_{old}} + \Delta\tau_{hist_{max}})$ Else (negative shift in $\tau_{hist}$)

$\quad \tau_{hist'} = \max(\tau_{hist_{new}}, \tau_{hist_{old}} - \Delta\tau_{hist_{max}})$ EndIf

FIG. 8a $$\tau_{hist} = (1 - \alpha_{hist}) \cdot \tau_{hist}' + (\alpha_{hist}) \cdot \tau_{hist_{old}}$$

$\Big\{$ if ambient temperature is "stable"

$\quad\quad \alpha_{hist} = \alpha_{hist_{LONG}}$

Else $\quad\quad \alpha_{hist} = \alpha_{hist_{SHORT}}$

EndIf

FIG. 8b $$\begin{cases} \text{IF } MAD_{hot} \geq MAD_{thresh} \\ \qquad \tau_{kmeans_{new}} = \max(\tau_{new}, \tau_{min}) \\ \text{ELSE} \\ \qquad \tau_{kmeans_{new}} = 2 \cdot \max(\tau_{new}, \tau_{min}) - \mu_{ambient} \\ \text{END IF} \end{cases}$$

FIG. 8c

If ambient temperature is "stable"

$$\alpha_{kmeans} = \alpha_{kmeans_{LONG}}$$

Else $$\alpha_{kmeans} = \alpha_{kmeans_{SHORT}}$$

Endif

FIG. 8d

FAST TARGET EXTRACTION FROM THERMAL IMAGERY

FIELD OF THE INVENTION

The present invention relates, in general, to a system and method for extracting an object of interest from a series of images. More specifically, the present invention relates to a system and method for extracting warm or hot objects from a series of images taken by a thermal video camera.

BACKGROUND OF THE INVENTION

Detecting and extracting warm objects from thermal images is a difficult process. The process is prone to false results. Objects that should be detected may be classified as part of the background image, and background pixels may be classified as part of the object of interest.

Conventionally, warm or hot objects may be segmented from a scene by setting a threshold temperature value. If the temperature of the object is above the set threshold, the object may be separated from the remainder of the scene. The threshold may be set to a single value. Values above the threshold may be set to a value of 1 and values below the threshold may be set to a value of 0. In this manner, a warm or hot object may be segmented from the scene.

There are various methods of performing segmentation of a scene. These include, for example, clustering methods, histogram methods, gradient methods, and edge detection methods. Clustering methods attempt to partition an image into predefined number of clusters or classes. Frequently, this approach is iterative and requires calculations of distances between clusters and distances to the center of each cluster. Histogram methods may also be used for segmenting a scene. Histograms depicting distributions of pixel values may be computed and a threshold may be set based on results of the image histograms. Sometimes, a smoothed histogram may be examined for peaks and valleys and a decision may be made based on expectation of maximizing a certain distribution of pixel values.

Clustering or histogram methods are typically low power consumers, but result in undesired increases in false target classifications. This is due to computing a minimum value or maximum value, while failing to account for benign scene contents. In addition, these methods are likely to fail, because they fail to account for scene changes occurring due to camera movements or complete changes in contents of the scenes.

Additional segmentation methods may also include Fourier analysis, pattern classification, or template matching. These approaches consume a large amount of computational power and are generally not suitable for use by hand-held thermal cameras, or devices that use FPGAs operating on battery power.

As will be explained, the present invention uses multiple methods that together provide a reliable global threshold for segmenting a target of interest from a background scene in a set of video frames. The present invention advantageously consumes little power and achieves a low false alarm rate. The present invention may be reliably used in an environment, in which a user rapidly moves the camera and the scene rapidly changes between frames.

SUMMARY OF THE INVENTION

To meet this and other needs, and in view of its purposes, the present invention provides a method for extracting a target from a series of images including the steps of: (a) estimating an ambient temperature value of pixels in the series of images; (b) finding a band of pixel values having temperature values above the ambient temperature value, the band of pixel values forming a histogram; (c) differentiating the histogram to estimate a threshold; (d) extracting the target having pixel values above the threshold; and (e) colorizing the target for display.

Step (a) of the method includes forming a first subset of pixel values of a current image defining a window of pixel values having a predetermined temperature variation; and computing the ambient temperature value of the first subset of pixel values of the current image.

Step (b) of the method includes finding a minimum threshold value above the ambient temperature value; and selecting a second subset of pixel values of a current image having values above the minimum threshold value, the second subset of pixel values forming the histogram.

Step (c) of the method includes computing a first derivative of the histogram, computing a second derivative of the histogram, and forming the threshold based on boundaries set for the first and second derivatives.

The method also includes filtering the computed ambient temperature value, based on a previously computed ambient temperature value of a subset of pixel values belonging to a previous image.

Another embodiment of the present invention provides a second method for extracting a target from a series of images, which includes the steps of: (a) estimating an ambient temperature value of pixels in the series of images; (b) forming a band of pixel values of a current image, the band comprising an amount of pixels less than an amount of pixels in an image; (c) clustering the band of pixel values into a target class and a background class; d) computing a threshold value between the target class and the background class; (e) extracting the target having pixel values above the threshold value; and (f) colorizing the target for display.

Step (a) of the second method includes forming a first subset of pixel values of a current image defining a window of pixel values having a predetermined temperature variation; and computing the ambient temperature value of the first subset of pixel values of the current image. Step (a) also includes filtering the estimated ambient temperature value, based on a previously estimated ambient temperature value of a subset of pixel values belonging to a previous image.

Step (b) of the second method includes forming the band of pixel values ranging below the ambient temperature value by a first amount and above the ambient temperature value by a second amount. The first amount is different from the second amount.

Step (c) of the second method includes setting an initial threshold value in the band of pixel values for separating the target class from the background class.

Step (d) of the second method includes estimating a distribution value of the target class. If the distribution value is above a predetermined value, then the target is determined to exist. Step (d) also includes filtering the threshold value of a current image based on a threshold value of a previous image.

The second method further includes computing a mean value of the target class and a mean value of the background class, and setting a new threshold value based on the computed mean values.

Yet another embodiment of the present invention provides a third method for extracting a target from a series of images, which includes the steps of: (a) estimating an ambient temperature value of pixels in the series of images; (b) finding a first band of pixel values of a current image having temperature values above the ambient temperature value, the first band of pixel values forming a histogram; (c) smoothing the histogram to estimate a first threshold; (d) forming a second band of pixel values of the current image; (e) clustering the second band of pixel values into a target class and a background class; (f) computing a second threshold value between the target class and the background class; (g) extracting the target based on the first and second thresholds; and (h) colorizing the target for display.

Step (a) of the third method includes forming a subset of pixel values of a current image defining a window of pixel values having a predetermined temperature variation; and computing the ambient temperature value of the subset of pixel values of the current image.

Step (c) of the third method includes computing a first derivative of the histogram, computing a second derivative of the histogram, and forming the first threshold based on boundaries set for the first and second derivatives.

Step (e) of the third method includes setting an initial threshold value in the second band of pixel values for separating the target class from the background class; and computing a mean value of the target class and a mean value of the background class. Step (f) includes setting the second threshold value based on the computed mean values.

Step (g) of the third method includes combining the first and second thresholds, using a weighted average, to form a third threshold; and extracting the target using the third threshold.

The third method also includes the steps of: (i) filtering the first and second threshold values of a current image based on first and second threshold values, respectively, of a previous image; (j) forming a first subset of pixel values of a current image defining a window of pixel values having a predetermined temperature variation; and (k) computing the ambient temperature value of the first subset of pixel values of the current image.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures:

FIG. 1c shows the derivation of absolute difference #1 ($\alpha_1$) and absolute difference #2 ($\alpha_2$) based on the flow diagram of FIG. 1a, in accordance with an embodiment of the present invention.

FIG. 2 shows the pseudo-code describing the manner in which the transition between coefficients is smoothed in the temperature approximation algorithm, in accordance with an embodiment of the present invention.

FIG. 8a shows the pseudo-code of a first technique in limiting changes of a threshold value between frames of an image, in accordance with an embodiment of the present invention.

FIG. 8b shows the pseudo-code of an IIR filtering technique that limits changes of a threshold value between frames of an image, in accordance with an embodiment of the present invention.

FIG. 8c shows a pseudo-code for preventing false colorization of background clutter, during determination of a threshold value, in accordance with an embodiment of the present invention.

FIG. 8d shows a pseudo-code for changing between a long coefficient and a short coefficient, during determination of a threshold value, in accordance with an embodiment of the present invention.

DETAILED DESCRIPTION OF THE INVENTION

Figure 1A:
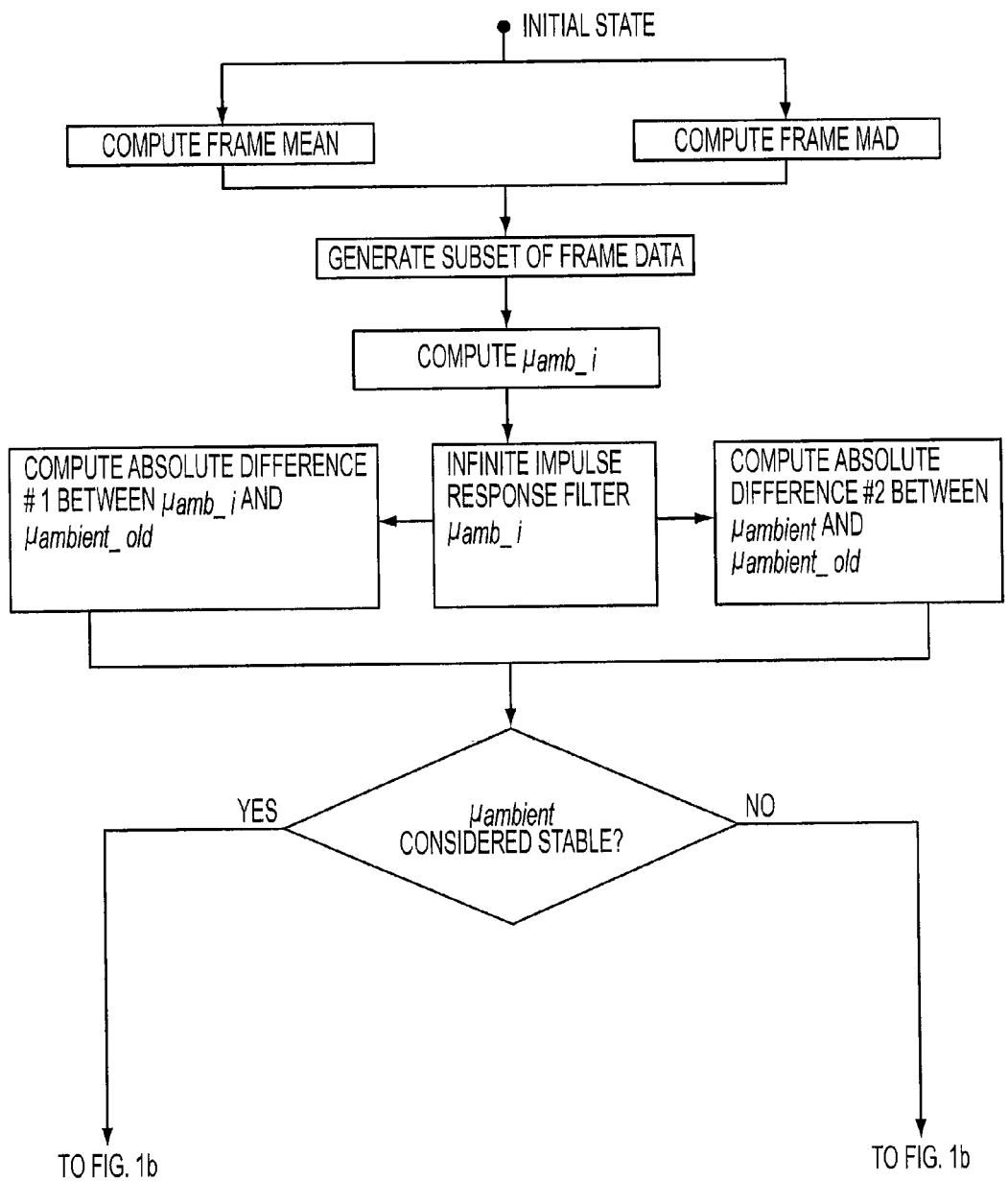
FIGS. 1a and 1b are flow diagrams of an ambient temperature approximation algorithm, in accordance with an embodiment of the present invention.

The present invention uses a combination of methods to determine a reliable global threshold for detecting and extracting a target from the background clutter of a set of frames taken by a thermal camera (for example, an IR camera). The present invention first determines a digital count value representing the temperature of the background in the image frames. This is sometimes referred to herein as determining the ambient conditions of the background in the image. Based on the ambient conditions, the present invention segments the image into two sets: warm or hot objects and background. A thermal band of warm or hot objects is often different (e.g. brighter) than the surrounding background. The segmentation method depends on two distinct histogram-based processing approaches, as briefly described below.

The first approach to segment the imagery makes the following three assumptions about content in the long-wave infrared (LWIR) imagery: (1) pixels corresponding to human subjects in the scene do not represent the dominant content of the scene; (2) pixels corresponding to human subjects and their clothing exhibit a broad range of temperatures (or, equivalently, a broad range of digital count values) which are uncharacteristic of the background content; and (3) pixels corresponding to human targets are expected to have digital count values above the ambient scene digital count value (or temperature). These three assumptions, based on observations, suggest a feature in the image histogram that the first approach exploits in order to establish a threshold to perform the segmentation process. That feature, in particular, is finding a broad, short peak centered about a digital count level sufficiently higher than that established for the ambient level. Accordingly, the present invention determines first and second derivatives of histogram distribution functions to estimate the slopes of the histograms. The histograms are then smoothed to reduce any influence of spurious peaks, valleys and gaps. In addition, minimal distances from ambient values are estimated to determine a first candidate threshold for the segmentation process.

The second approach to segment the image makes an intentionally incorrect assumption that every image has hot and cold objects, where the hot objects are significantly different from the ambient condition. Using a novel clustering method, every image frame is categorized into two different classes, namely a target class and a background class. A second dynamic threshold value is determined that falls between the two classes. The second dynamic threshold is filtered to minimize changes between frames.

Finally, the present invention combines both dynamic threshold values by using a weighted average to provide a well computed global dynamic threshold for the segmentation process. The global dynamic threshold yields segmentation of a target of interest, such as a human being, from the background clutter in the image. Once classified as a target of interest, the present invention colors the portions of the image so classified for eventual display to a user. The present invention will now be described in more detail by reference to the figures.

Determining Ambient Temperature

Figure 1B:
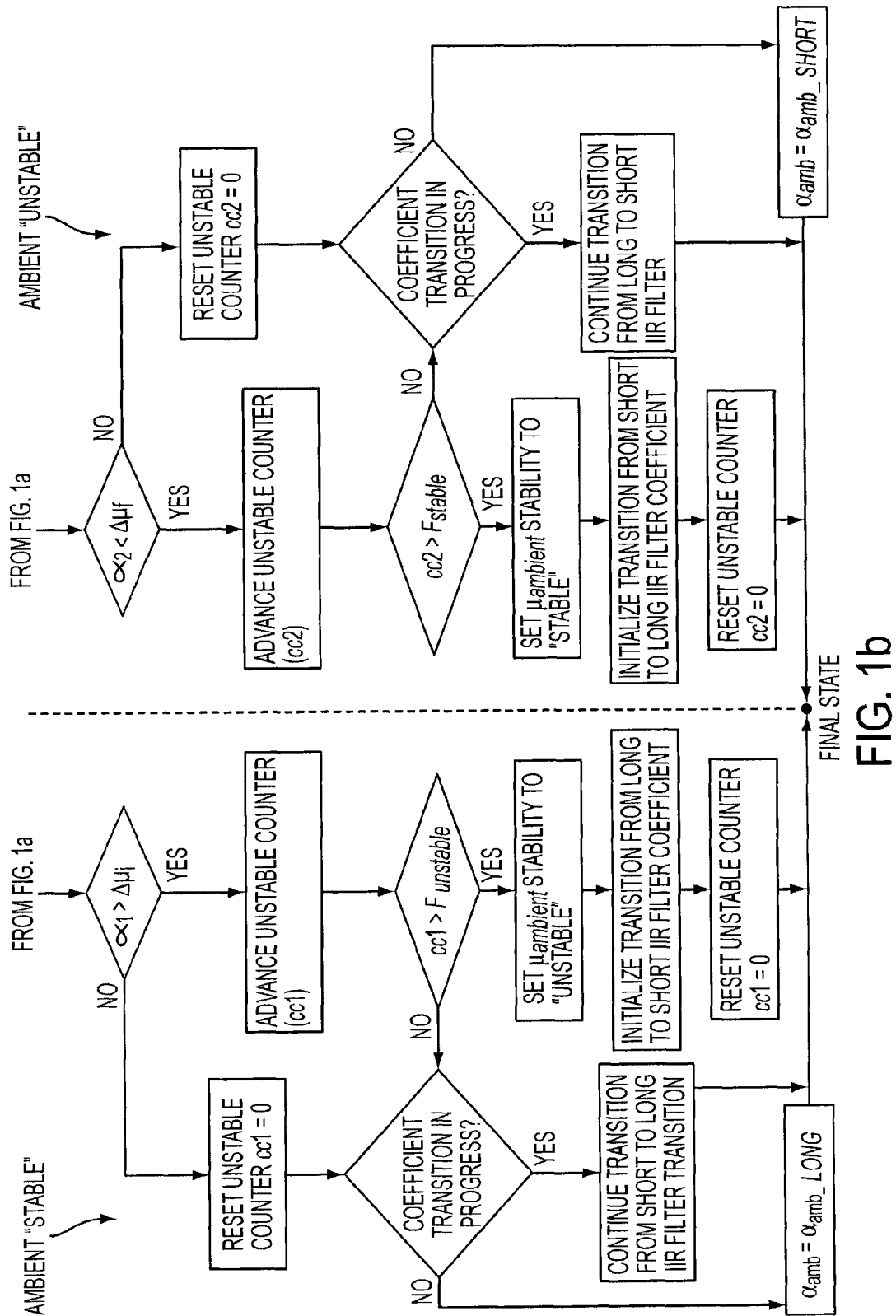

The ambient temperature of background clutter is metadata that is used in conjunction with a series of image frames for target detection and extraction. Knowledge of ambient temperature of a scene helps to isolate the background clutter from other objects in the scene, such as human targets. The present invention uses an ambient temperature approximation algorithm (as outlined in FIGS. 1a and 1b) to establish a temperature estimate of the background clutter. This is accomplished using scene statistics from raw LWIR (for example) image frames. The steps shown in these figures are described below.

Objects at temperature extremes may have a significant impact on the calculation of ambient temperature. Even if such objects appear as a small fraction of pixels in the image frame, these pixels may skew the results of the ambient temperature calculation, if they are included in the calculation. Therefore, only a subset of the data from the LWIR image is considered when estimating the ambient temperature. This subset of data, denoted by $\tilde{p}$, includes pixel values from the LWIR image frame that fall within the range given by Equation 1.

$$\tilde{p} \in p | (\mu_0 - \Delta T) < p < (\mu_0 + \Delta T) \quad (1)$$

where:

$\tilde{p}$ is subset of pixel values used for ambient temperature approximation, p is a pixel value in the LWIR image (for example), $\mu_0$ is the mean of the frame, and $\Delta T$ is a value used to define a window size (or a band) of valid pixel values.

The value $\Delta T$ is determined by measuring the spread of the image data with a mean of absolute differences (MAD) calculation, as shown in Equation 2.

$$MAD_{frame} = \frac{\sum_{i=1}^{N_{pixels}} |\mu_0 - p_i|}{N_{pixels}} \quad (2)$$

where:

$\mu_0$ is the mean of the frame, $p_i$ is the $i^{th}$ pixel of the frame, and $N_{pixels}$ is the total number of pixels in the frame.

Once $MAD_{frame}$ is computed, a factor, denoted by $c_1$, is used to emulate a standard deviation value. A bound on the magnitude of $\Delta T$ is also used to prevent too many pixel values from being included in the data subset, as shown below:

$$\Delta T = \min(c_1 \cdot MAD_{frame}, \Delta T_{max}) \quad (3)$$

where:

$c_1$ is a factor used to emulate a standard deviation value, $MAD_{frame}$ is the MAD of the frame, and $\Delta T_{max}$ is an upper bound on $\Delta T$.

By excluding pixels that fall outside of $(\mu_0 \pm \Delta T)$, any pixels corresponding to extreme temperature values are avoided by the present invention.

Once the appropriate data is identified, the ambient temperature calculation is performed by computing the mean of the data subset, $\tilde{p}$, as follows:

$$\mu_{amb_i} = \tilde{\mu} = \frac{\sum_{1}^{\tilde{p}_{TOTAL}} \tilde{p}_i}{\tilde{p}_{TOTAL}} \quad (4)$$

where:

$\mu_{amb}$ is the instantaneous ambient temperature approximation, $\tilde{\mu}$ is the mean of $\tilde{p}$, $\tilde{p}_{TOTAL}$ is the total number of pixels in $\tilde{p}$, and $\tilde{p}_i$ is the $i^{th}$ pixel in $\tilde{p}$.

An important part of the ambient approximation algorithm is the manner in which the instantaneous ambient temperature value, $\mu_{amb_i}$, is filtered. In order to determine an ambient temperature approximation, denoted by $\mu_{ambient}$, the $\mu_{amb_i}$ value is filtered using an infinite impulse response (IIR) filter, as shown in Equation 5.

$$\mu_{ambient} = (1 - \alpha_{amb}) \cdot \mu_{amb_i} + (\alpha_{amb}) \cdot \mu_{ambient_{old}} \quad (5)$$

Where:

$\mu_{ambient}$—IIR filtered ambient temperature approximation $\alpha_{amb}$—IIR filter coefficient $\mu_{amb_i}$—ambient temperature approximation of current frame $\mu_{ambient_{old}}$—IIR filtered ambient temperature approximation of previous frame The IIR filter coefficient $\alpha_{amb}$, however, is not treated as a static value by the present invention. In order to account for changing scene content, $\alpha_{amb}$ is permitted to alternate between two different IIR filter coefficients. One of the coefficients results in a short response, while the other coefficient yields a long response. The long filter coefficient, $\alpha_{amb_{LONG}}$, is used to suppress moderate variations in $\mu_{amb_i}$ when the scene content remains relatively constant. The short filter coefficient is used when there are large changes in scene content (i.e. when the user changes his view from the ground to the sky). The short filter coefficient, $\alpha_{amb_{SHORT}}$, provides a response that is sufficiently sensitive to allow $\mu_{amb_i}$ to adapt quickly to a new value; but it is also strong enough to suppress rapid fluctuations occurring from frame to frame.

The transition between coefficients is based upon the stability of $\mu_{ambient}$. Two different tests are performed by the present invention to determine whether $\mu_{ambient}$ is considered "stable" or "unstable." Absolute differences are computed as shown in FIG. 1c. Initially the state of $\mu_{ambient}$ is assumed to be "unstable," so that the algorithm may adjust to the scene content. In this "unstable" state, the IIR filter coefficient $\alpha_{amb_{SHORT}}$ is used, which lightly dampens variations in $\mu_{amb_j}$. Accordingly, a test to decide whether $\mu_{ambient}$ has become "stable" relies on the filtered ambient temperature approximation from both the current frame, $\mu_{ambient}$, and the previous frame, $\mu_{ambient_{old}}$. If the absolute difference between these two values is less than $\Delta\mu_f$ counts per frame for $F_{stable}$ consecutive frames, then the $\mu_{ambient}$ value is determined to be "stable."

When the $\mu_{ambient}$ value is assumed to be "stable", the IIR filter employs the coefficient $\alpha_{amb_{LONG}}$, which generates a long response. Since the long response suppresses fluctuations in the $\mu_{ambient}$ value, a comparison of filtered values from consecutive frames does not provide a good indication of when the state of $\mu_{ambient}$ becomes "unstable." Thus, the instantaneous ambient temperature approximation, $\mu_{amb_j}$, is compared to the filtered ambient temperature approximation from the previous frame, $\mu_{ambient_{old}}$. The absolute difference between these two values is computed. If the result is greater than $\Delta\mu_i$ counts per frame for $F_{unstable}$ consecutive frames, $\mu_{ambient}$ is determined to be "unstable."

Pseudo code describing the transition between coefficients is shown in FIG. 2. The following are the terms related to FIG. 2:

$\mu_{amb_j}$ is the instantaneous ambient temperature approximation, $\mu_{ambient}$ is the IIR filtered ambient temperature approximation of the current frame, $\mu_{ambient_{old}}$ is the IIR filtered ambient temperature approximation of the previous frame, $\Delta\mu_i$ is the unstable ambient temperature threshold value, $\Delta\mu_f$ is the stable ambient temperature threshold value, $F_{stable}$ is the number of "stable" consecutive frames needed before $\mu_{ambient}$ is considered "stable", $F_{unstable}$ is the number of "unstable" consecutive frames needed before $\mu_{ambient}$ is considered "unstable", $F_{trans}$ is the number of frames used to transition between coefficients, $\alpha_{amb_{LONG}}$ is the IIR filter coefficient with a long response, $\alpha_{amb_{SHORT}}$ is the IIR filter coefficient with a short response, and $\alpha_{amb}$ is the IIR filter coefficient implemented.

As shown in the pseudo code of FIG. 2, an additional step is performed to smooth the transition between coefficients. When switching filter coefficients, the change takes place over $F_{trans}$ frames at evenly spaced intervals. This change is executed using Equation 6a when changing from $\alpha_{amb_{LONG}}$ to $\alpha_{amb_{SHORT}}$, and Equation 6b when changing from $\alpha_{amb_{SHORT}}$ to $\alpha_{amb_{LONG}}$ as follows:

$$\alpha_{amb_j} = \frac{((j) \cdot \alpha_{amb_{SHORT}} + (F_{trans} - j) \cdot \alpha_{amb_{LONG}})}{F_{trans}}, \quad (6a)$$
$$j = 1, 2, \ldots, F_{trans}$$

$$\alpha_{amb_j} = \frac{((j) \cdot \alpha_{amb_{LONG}} + (F_{trans} - j) \cdot \alpha_{amb_{SHORT}})}{F_{trans}}, \quad (6b)$$
$$j = 1, 2, \ldots, F_{trans}$$

where:

j is the $j^{th}$ frame in the transition between coefficients, $F_{trans}$ is the number of frames used to transition between coefficients, $\alpha_{amb_{LONG}}$ is the IIR filter coefficient with a long response, $\alpha_{amb_{SHORT}}$ is the IIR filter coefficient with a short response, and $\alpha_{amb_j}$ is the IIR filter coefficient implemented on the $j^{th}$ frame during the transition between coefficients.

Figure 3:
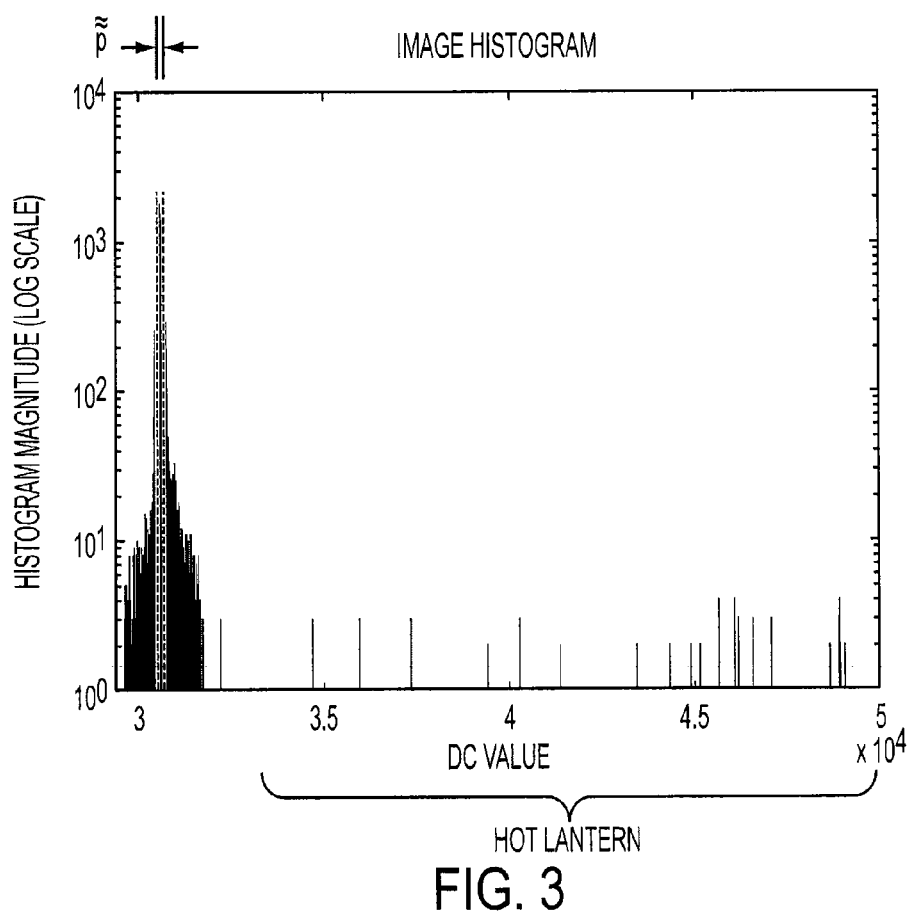
FIG. 3 is a histogram of an LWIR (Long Wave Infrared) image on a logarithmic scale, representing five humans walking out from dense trees, with the sky peering through and a small hot lantern held by one of the humans.
Figure 4:
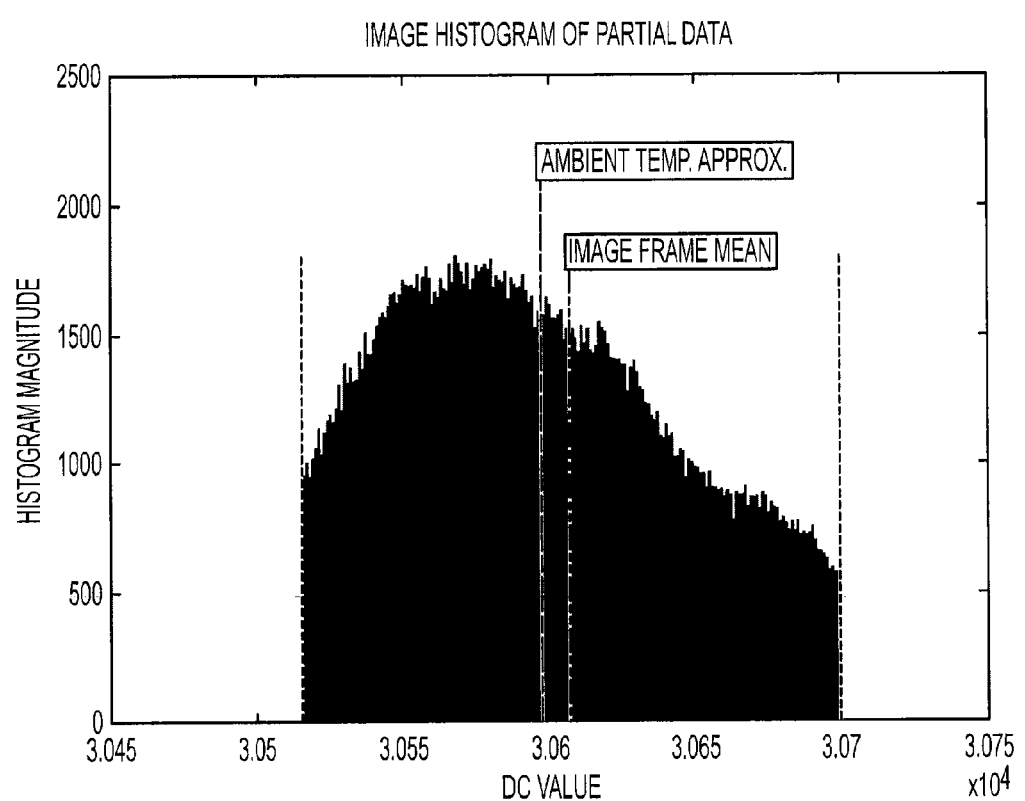
FIG. 4 is a histogram of the same LWIR image, showing only a subset of the pixels on a linear scale.

FIG. 3 shows a histogram of an LWIR image, representing five humans walking out from dense trees. The histogram is plotted on a semi-log scale to help visualize bins containing a low number of counts, such as pixel values that correspond to the sky peering through these dense trees and a small hot lantern held by one of the humans. The selected subset of pixels, namely $\tilde{p}$, fall between the region bounded by the tall vertical bars and are labeled "$\tilde{\tilde{p}}$". FIG. 4 shows only the histogram of a subset of pixels $\tilde{\tilde{p}}$ from the same LWIR image using, however, a linear scale. Both the image frame mean and the mean of the subset of pixels of $\tilde{\tilde{p}}$ are labeled. The ambient temperature approximation is also shown.

These figures illustrate the importance of using the subset of pixels of $\tilde{p}$ to determine the ambient temperature, rather than using the pixel data from the entire image frame. Even if a small percentage of the frame is occupied by a hot object, the frame mean may shift above the ambient temperature approximation, as shown in FIG. 4. It will be appreciated that objects exhibiting cold temperatures have the same effect, except that they shift the image frame mean below the ambient temperature approximation.

Referring again to FIG. 1, there is shown a flow diagram for determining the ambient temperature of a series of frames, in accordance with an embodiment of the present invention. The names of the variables used in the algorithm for the ambient temperature approximation are listed in Table 1, below. The relationships of these variables to each other are detailed in the aforementioned Equations.

TABLE 1

Variable List for the Ambient Temperature Approximation shown in FIG. 1.

| Variable | Name | Units |
|---|---|---|
| $C_1$ | standard deviation factor | scalar |
| $\Delta T_{max}$ | upper bound on $\Delta T$ | counts |
| $\alpha_{amb_{LONG}}$ | IIR filter coefficient (Long response) | scalar |
| $\alpha_{amb_{SHORT}}$ | IIR filter coefficient (Short response) | scalar |
| $\Delta\mu_i$ | unstable ambient temperature threshold value | counts |
| $\Delta\mu_f$ | stable ambient temperature threshold value | counts |
| $F_{stable}$ | Number of frames observed before ambient temperature is considered "stable" | frames |
| $F_{unstable}$ | Number of frames observed before ambient temperature is considered "unstable" | frames |
| $F_{trans}$ | Number of frames to transition between IIR filter coefficients | frames |

Determining Target Threshold

Once the present invention computes the ambient temperature, the segmentation phase of the invention is executed. The segmentation phase includes two separate methods for computing a global threshold value. The global threshold value is used to extract a target of interest (generally a warm or hot target, such as a human).

Human and other warm targets in a field-of-view (FOV) of an imaging camera may be colorized using a threshold value. Objects exhibiting temperatures higher than the threshold value may be colorized according to saturation and hue look-up-tables (LUTs) stored in a memory disposed in the camera. A microprocessor or a microcontroller, embedded in the camera, may be used to execute, in parallel, an algorithm, as shown in FIG. 1, for determining the ambient temperature of the image, and other algorithms for determining a target threshold, as described below. The manner in which the present invention selects a first target threshold and, separately, selects a second target threshold is described below.

In general, the target threshold values rely on metadata provided by the ambient approximation algorithm. The first method of selecting a threshold utilizes the characteristics of an image histogram. In order to assist in quantifying such characteristics, derivatives of the image histogram are also used. The second method utilizes an iterative approach of separating two object classes in an image.

Both algorithms used to determine a threshold value take advantage of a number of different properties found in each image frame. Most objects associated with background clutter do not exhibit much variation in temperature from one another. If there are significant temperature variations between background objects, they tend to be found between different types, or classes of objects (i.e. grass vs. sky). Objects within a single class, however, do not often show evidence of large variations in temperature. The background clutter that demonstrates these characteristics produces narrow regions in the histogram with large amplitudes, also identified by large concavity. Threshold values, which effectively separate warm targets from background clutter, tend to be found in regions of an image histogram where the concavity is relatively small and in regions where the histogram is not a relative maximum. Additionally, many objects identified as background clutter do not contain internal heat sources, unlike the human body. The human body, on the other hand, is constantly generating heat and exhausting some of that heat to the surrounding environment. Clothing, hair and exposed surface skin directly interact with the surrounding environment. The temperature of the surface skin varies at different locations on the body and is different from the internal temperature of the human body. Clothing and hair, on the other hand, serve as insulators and tend to have temperatures similar to the surrounding environment. Between clothing, hair and different areas of exposed surface skin, the distribution of temperatures associated with the human body looks quite different from the distribution of temperatures associated with background clutter. This knowledge is used in both methods of the present invention to find an effective target threshold to discriminate between background clutter and human targets.

Figure 5A:
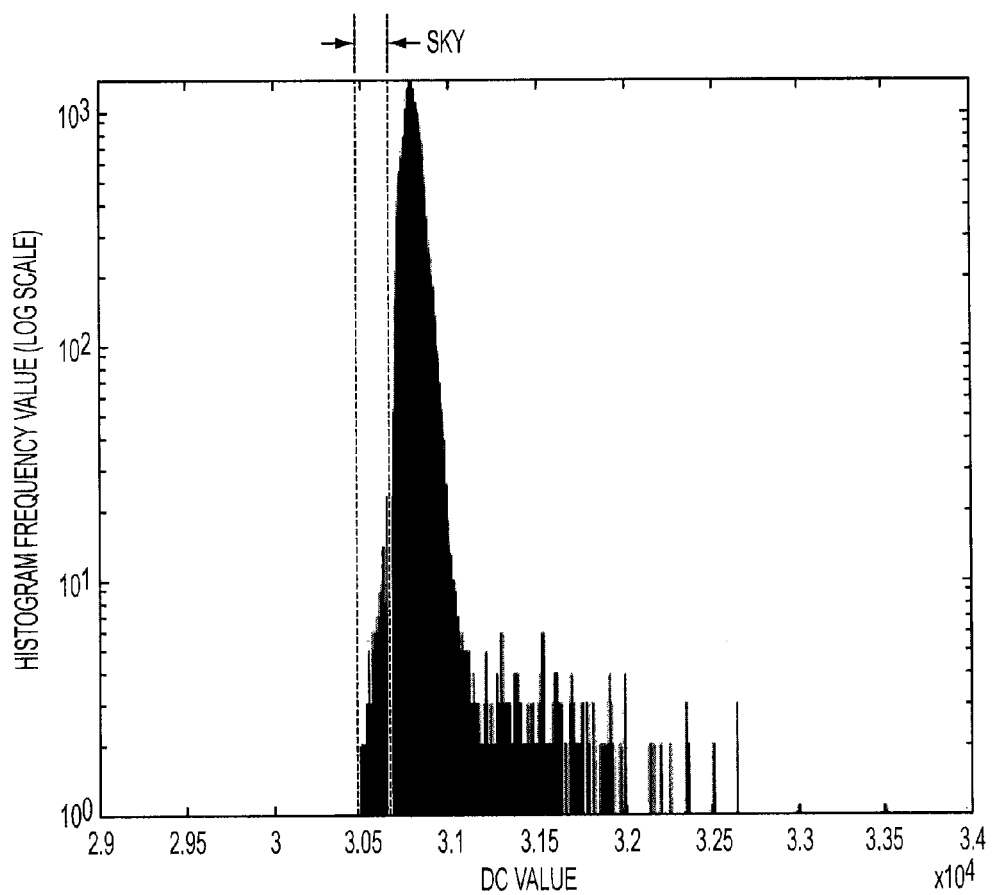
FIG. 5a is a histogram of the same LWIR image, showing the a portion of the sky between two vertical lines.
Figure 5B:
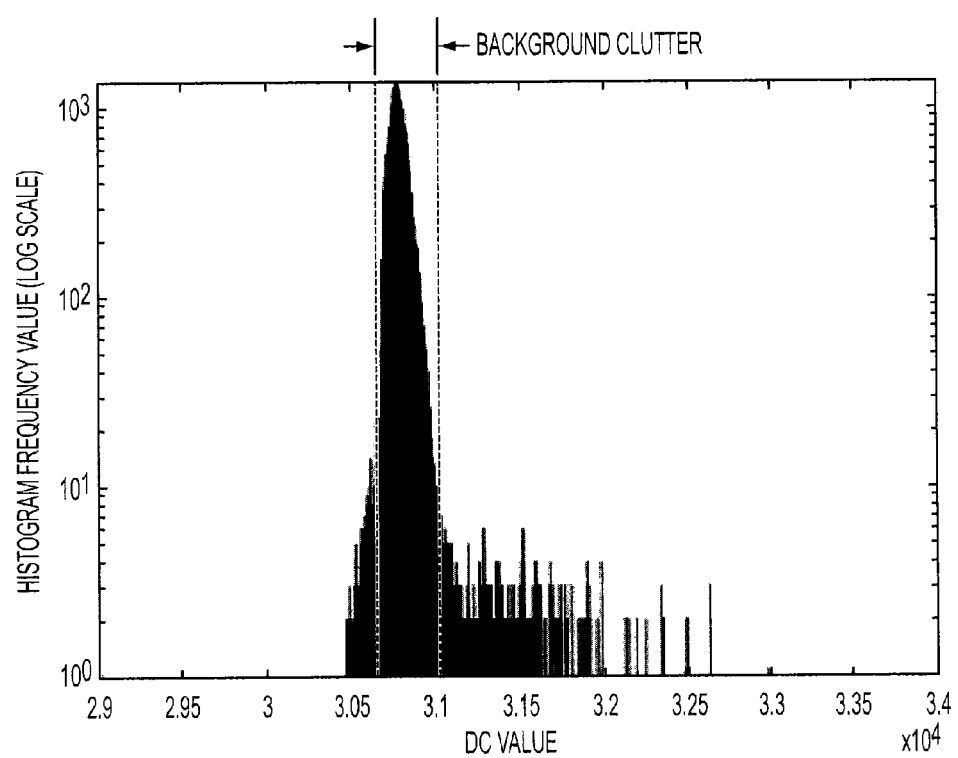
FIG. 5b is a histogram of the same LWIR image, showing the background clutter between two vertical lines.
Figure 5C:
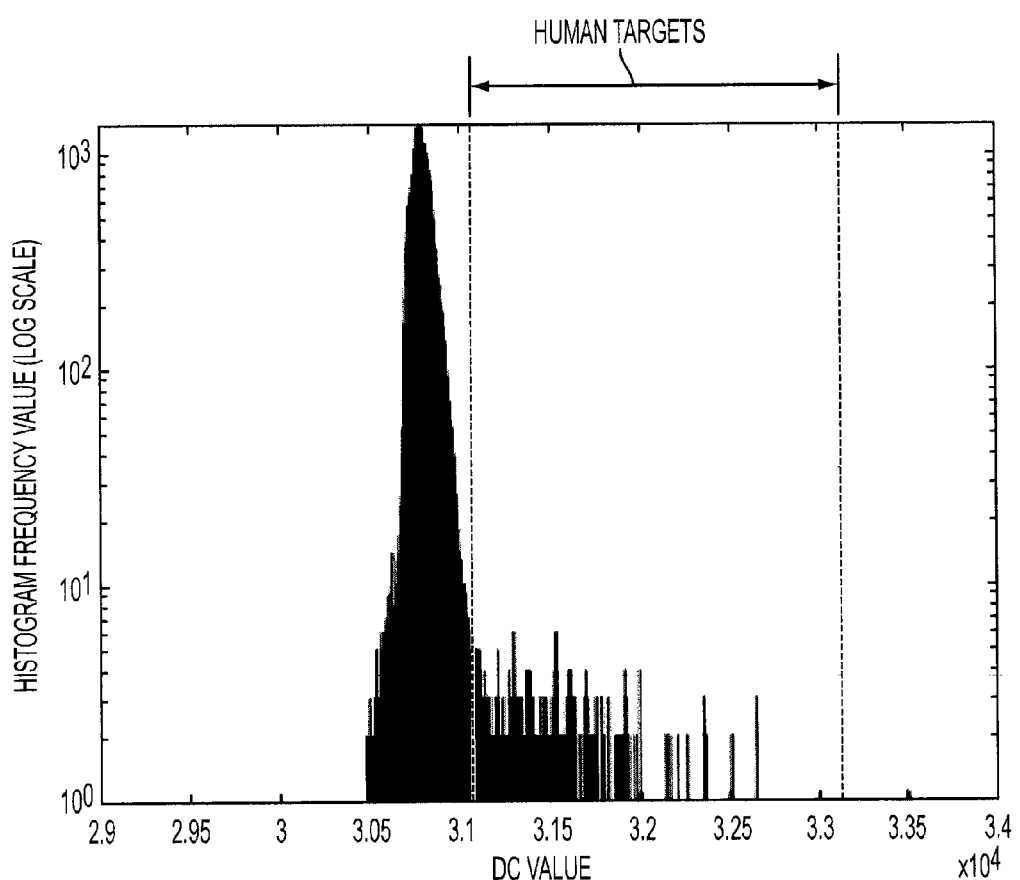
FIG. 5c is a histogram of the same LWIR image, showing the human targets between two vertical lines.

An illustration of this is shown in FIGS. 5a, 5b, and 5c, where the distributions of the background clutter take on forms different from the distribution of human targets. Three histograms of an LWIR image are shown on a semi-log scale. FIG. 5a shows the pixel distribution of the sky (see the values between two vertical lines); FIG. 5b shows the pixel distribution of the background clutter (see the values between two vertical lines; and FIG. 5c shows the pixel distribution of human targets (see the values between two vertical lines).

Minimum Threshold, $\tau_{min}$

A first step in determining a threshold is to define a minimum threshold value, $\tau_{min}$, which is used to ensure pixels are not colorized if their values are too close to the ambient temperature of the FOV. The minimum threshold value is based on the ambient temperature approximation and the spread of pixel values in the image. The spread of pixel data in an image frame is measured using a modified mean of absolute differences (MAD') calculation. In this calculation the ambient value, $\mu_{ambient}$, is used in place of the mean pixel value of the image (see Equation 2 for the mean pixel value). The modified MAD is calculated using Equation 7 as follows:

$$MAD'_{frame} = \frac{\sum_{i=1}^{N_{pixels}} |\mu_{ambient} - p_i|}{N_{pixels}} \quad (7)$$

where:
$MAD'_{frame}$ is the modified MAD of the present raw LWIR image frame,
$\mu_{ambient}$ is the ambient value calculated by Equation 5,
$N_{pixels}$ is the total number of pixels in the present frame, and
$p_i$ the $i^{th}$ pixel value of the present raw LWIR frame.

Note that the $\mu_{ambient}$ value used to determine $MAD'_{frame}$ may be computed on the prior frame, depending of the frame rate of the system.

Once the spread of the entire image frame is calculated, a smaller subset of data, $\tilde{p}$, is considered. This subset of data includes pixel values from the image that are within a given range around $\mu_{ambient}$. This range is defined by Equation 8, as follows:

$$\tilde{p} \in p | (\mu_{ambient} - \text{midstep}_{down}) < p < (\mu_{ambient} + \text{midstep}_{up}) \quad (8)$$

where:
$$\text{midstep}_{down} = \min(\text{midstep}_{down_{max}}, \alpha_{11} \cdot MAD'_{frame})$$

$$\text{midstep}_{up} = \min(\text{midstep}_{up_{max}}, \alpha_{12} \cdot MAD'_{frame})$$

and where:
$\text{midstep}_{down}$—offset defining lower bound on $\tilde{p}$
$\text{midstep}_{up}$—offset defining upper bound on $\tilde{p}$
$\text{midstep}_{down_{max}}$—maximum offset for lower bound on $\tilde{p}$
$\text{midstep}_{up_{max}}$—maximum offset for upper bound on $\tilde{p}$
$\tilde{p}$—data subset of LWIR image
p—raw LWIR image data
$\alpha_{11}$—scale factor
$\alpha_{12}$—scale factor Note that the $MAD'_{frame}$ value used to define the data subset may be computed on the prior frame, depending on the frame rate of the system.

The spread of the data in $\tilde{p}$ is used to calculate the minimum threshold value. To measure the spread, however, another MAD' calculation is used as shown in Equation 9:

$$MAD'_{middle} = \frac{\sum_{i=1}^{\tilde{N}_{pixels}} |\mu_{ambient} - \tilde{p}_i|}{\tilde{N}_{pixels}} \quad (9)$$

where:
$MAD'_{middle}$ is the modified MAD of subset $\tilde{p}$,
$\tilde{p}_i$ is the $i^{th}$ pixel value in the subset $\tilde{p}$, and
$\tilde{N}_{pixels}$ is the total number of pixels in subset $\tilde{p}$.

Note that $MAD'_{middle}$ may be computed on the prior frame, depending on the frame rate of the system.

is regulated by two parameter values: $\Delta\tau_{min_{low}}$ and $\Delta\tau_{min_{high}}$. This window prevents $\tau_{min}$ from collapsing too closely to the ambient value, which may lead to false colorization of the scene. It also prevents $\tau_{min}$ from straying too far from ambient, which may lead to missed targets. The minimum threshold is given by Equation 10 below:

$$\tau_{min} = \mu_{ambient} + \min\left(\Delta\tau_{min_{high}}, \max(\Delta\tau_{min_{low}}, \alpha_2 \cdot MAD'_{middle})\right) \quad (10)$$

where:
$\tau_{min}$ is a minimum allowable threshold,
$\Delta\tau_{min_{high}}$ is an offset defining an upper bound on $\tau_{min}$,
$\Delta\tau_{min_{low}}$ is an offset defining a lower bound on $\tau_{min}$, and
$\alpha_2$ is a scale factor.

Once $\tau_{min}$ has been determined, the threshold value, $\tau$, may be determined. One embodiment of the present invention computes an effective threshold value by taking the weighted sum of two candidate thresholds, one from a histogram approach detailed below and the other from a modified K-means approach also detailed below. In another embodiment, the threshold value may be computed based on each candidate threshold alone. Both candidate thresholds are described below.

Histogram Approach: Histogram and Derivative Generation

The first approach, or Histogram Approach, uses a histogram and its corresponding derivatives from each LWIR image frame to determine a threshold. The histogram, however, is not computed using the entire LWIR image frame. Instead, it is computed using a subset of data bounded by parameter values: $\Delta\tau_{min_{low}}$ and $\Delta h_{high}$, as shown in Equation 11:

$$s \in p \mid (\mu_{ambient} + \Delta\tau_{min_{low}}) < p < (\mu_{ambient} + \Delta h_{high}) \quad (11)$$

where:
s is a subset of the raw LWIR pixel data used for the histogram,
$\Delta\tau_{min_{low}}$ is an offset defining a lower bound on $\tau_{min}$,
$\Delta h_{high}$ is a high offset used to define the subset of s.

The histogram may be generated with a variable bin width set by a predetermined parameter. The finest possible resolution is 1 count per bin. By using the reduced data set and a moderate bin width, the histogram may be formed using a minimal number of bins.

Figure 6A:
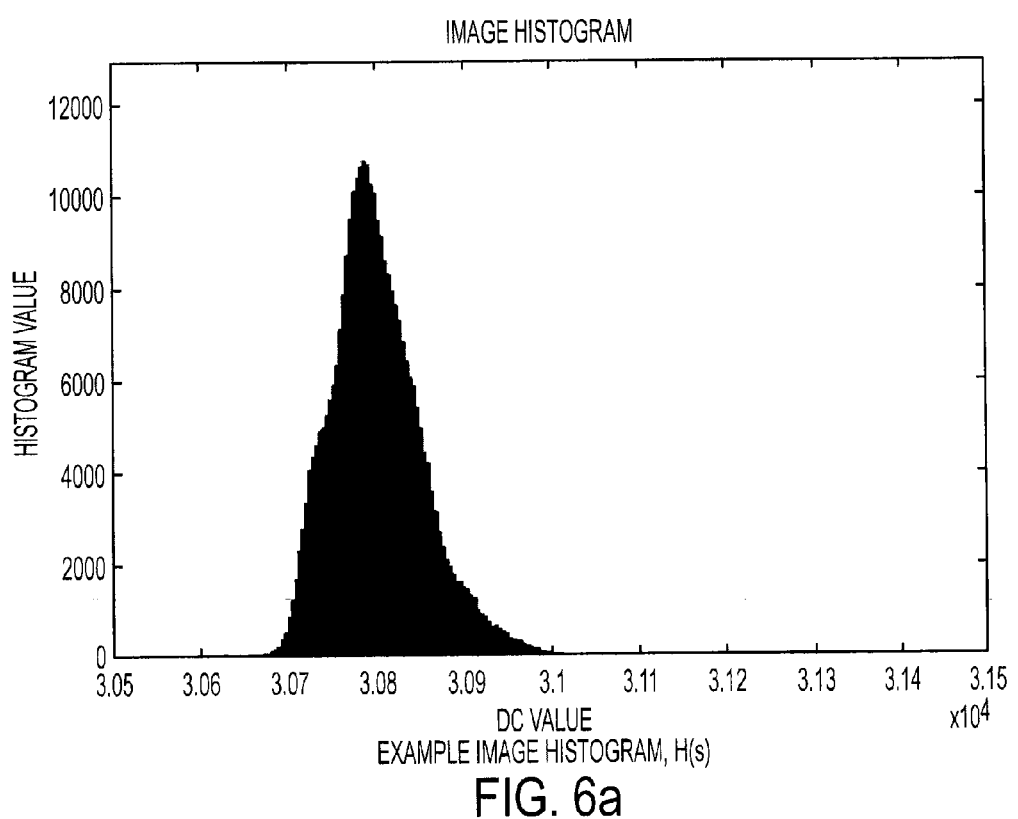
FIG. 6a is an example of an image histogram.
Figure 6B:
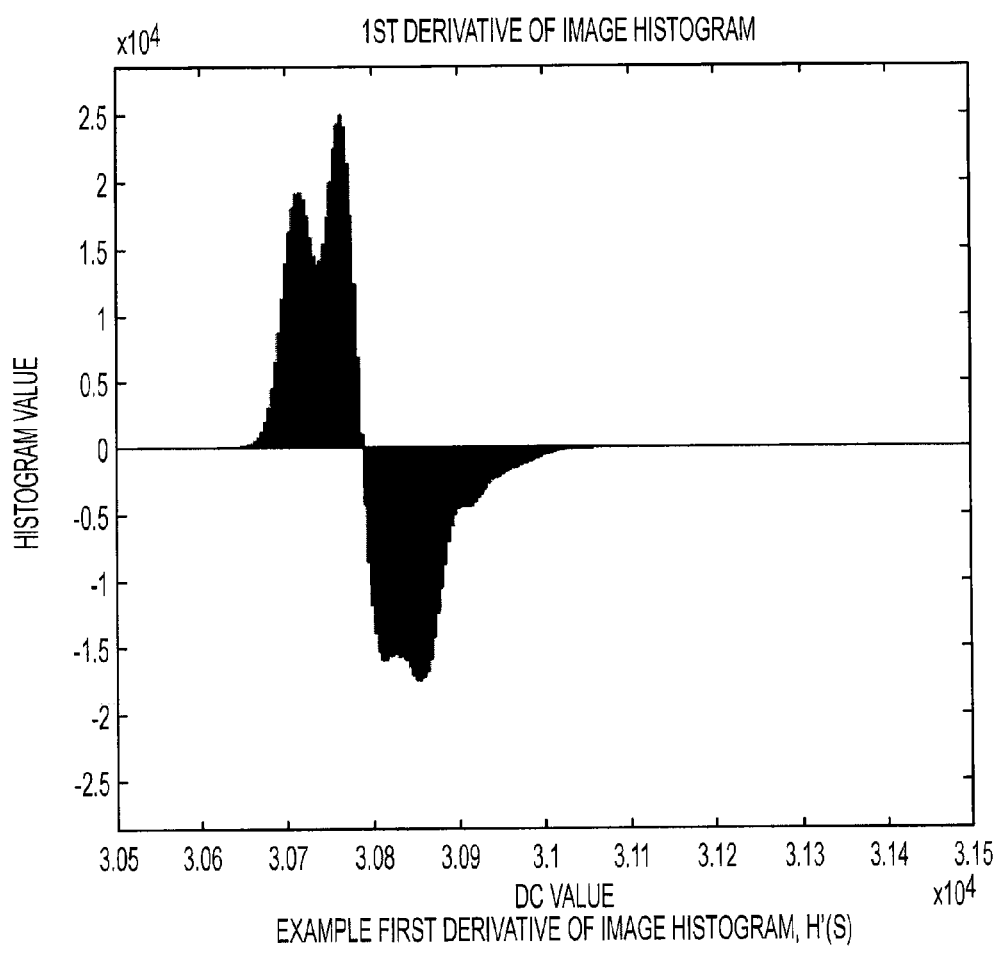
FIG. 6b is a first derivative of the image histogram shown in FIG. 6a, in accordance with an embodiment of the present invention.
Figure 6C:
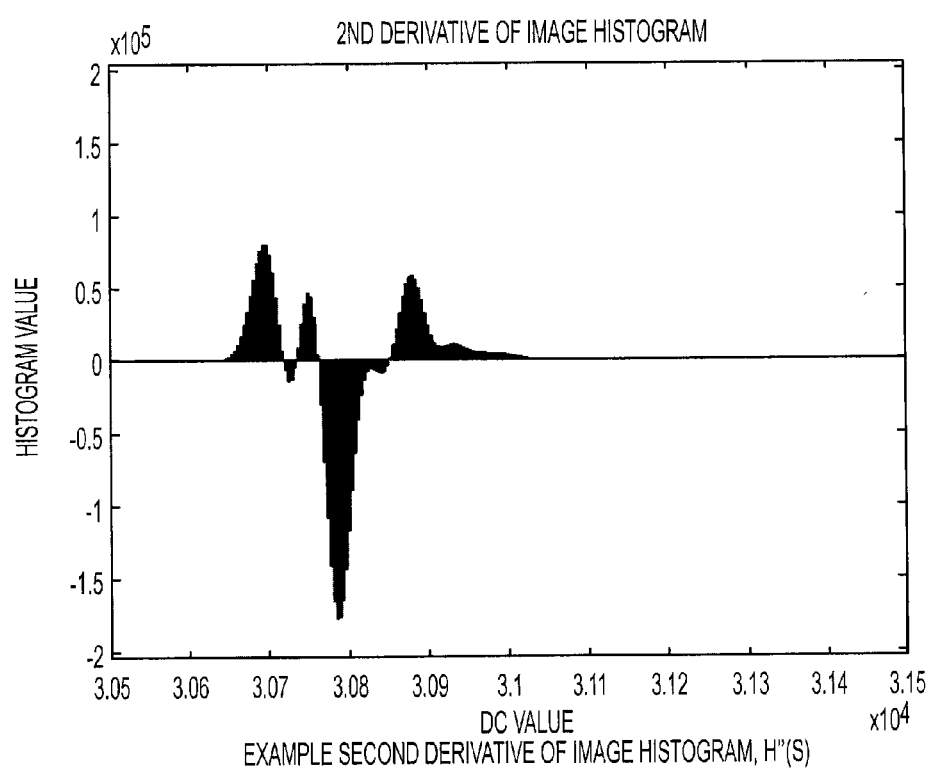
FIG. 6c is a second derivative of the image histogram shown in FIG. 6a, in accordance with an embodiment of the present invention.

Once the histogram, denoted by H(s), is formed, its first derivative is computed by convolving the histogram with a difference kernel. The difference kernel is a combination of both a derivative kernel and a blurring kernel. Moreover, the second derivative is computed by convolving the first derivative with the same kernel. The operations to determine the first and second derivatives of H(s) are shown in Equations 12a and 12b, respectively. Examples of images of a histogram and its derivatives are shown in FIGS. 6a, 6b and 6c.

$$H'(s) = H(s) * k_{diff} \quad (12a)$$

$$H''(s) = H'(s) * k_{diff} \quad (12b)$$

where:

$$k_{diff} = [1\ 1\ 1\ 1\ 1\ 1\ 0\ -1\ -1\ -1\ -1\ -1\ -1]$$

and where:
s a subset of data used for the histogram,
H(s) is the histogram,
H'(s) is the first derivative of the histogram,
H''(s) is the second derivative of the histogram,
$k_{diff}$ is the difference kernel, and
* denotes the convolution operation.

Since the first and second derivatives of the histogram are computed using a convolution operation, the conditions at the limits of the histogram are critical. In order for the first and second derivatives of the histogram to be valid over the range of values in the data subset s, the convolutions should preferably be performed on a histogram with a data subset that is slightly larger than the data subset s. This is because the pixels on the edges of the histogram derivatives are only valid if the kernel completely overlaps the data being convolved.

Histogram Approach: Threshold Selection

The next step in the method of the present invention is to examine the derivatives of the histogram under different conditions to find the threshold value, $\tau_{hist}$. Since the threshold must be greater than $\tau_{min}$, the values of H'(s) and H''(s) are considered where their bins correspond to values that are greater than $\tau_{min}$.

A valid threshold value is found where H'(s) is bounded by $d_{min}$ and $d_{max}$ and H''(s) is bounded by $g_{min}$ and $g_{max}$, where $d_{min}$, $d_{max}$, $g_{min}$, and $g_{max}$ are predetermined parameter values. These two conditions are shown in Equations 13a and 13b:

$$d_{min} < H'(s) < d_{max} \quad (13a)$$

$$g_{min} < H''(s) < g_{max} \quad (13b)$$

The minimum pixel value of the set of pixel values from the LWIR image that satisfy all the conditions given in Equations 13a, 13b and 13c may be selected as the threshold $\tau_{hist_{new}}$. Equation 14 describes the selection process:

$$\tau_{hist_{new}} = \min(T) \quad (14)$$

where:
$\tau_{hist_{new}}$ is the unfiltered histogram threshold value, and $$T = s \mid (s > \tau_{min}) \cap (d_{min} < H'(s) < d_{max}) \cap (g_{min} < H''(s) < g_{max})$$

In another embodiment of the present invention, the minimum of T may include a subset of the boundaries shown above, such as s must be greater than $\tau_{min}$ and the first derivative must fall between its indicated min and max values. In yet another embodiment, the minimum of T may include a subset of boundaries, such as s must be greater than $\tau_{min}$ and the second derivative must fall between its indicated min and max values.

If there is not a pixel in the LWIR image frame that satisfies the above noted conditions, the threshold value, $\tau_{hist_{new}}$, may be set to the minimum threshold value, $\tau_{min}$.

Figure 7:
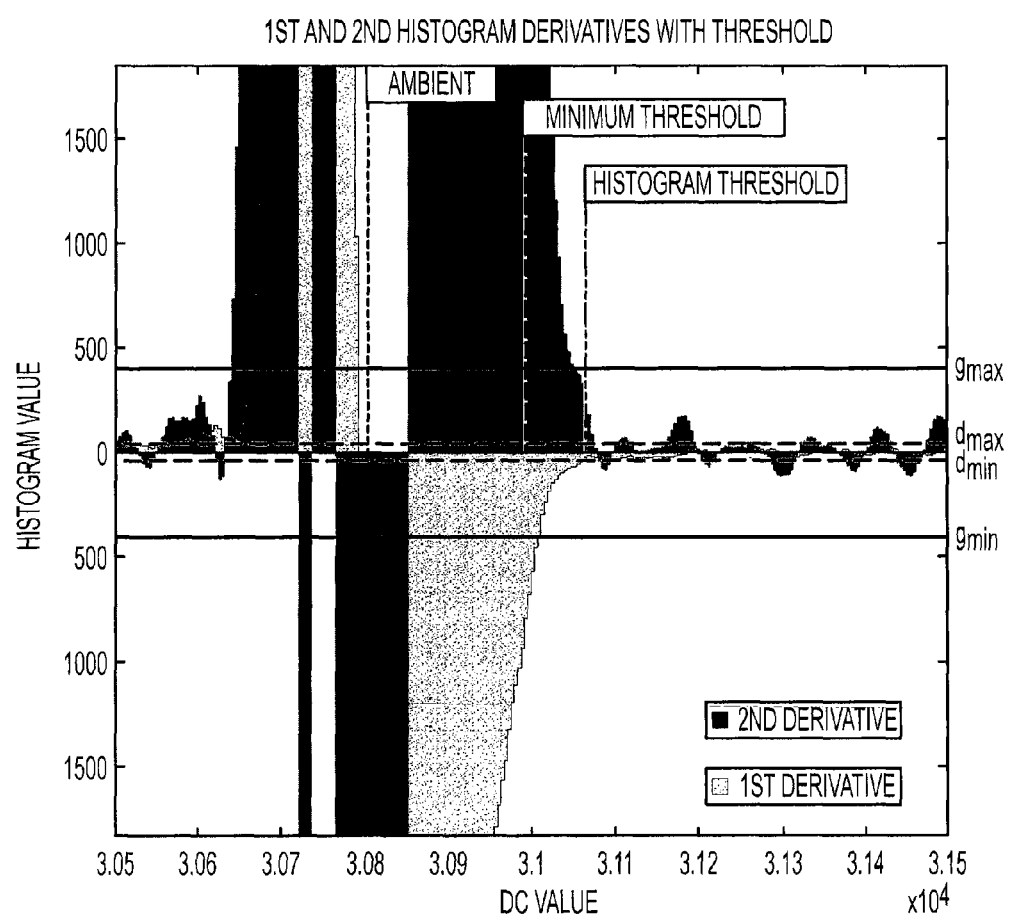
FIG. 7 is an enlarged version of the image histogram, and the first and second derivatives of the image histogram shown in FIG. 6a, in accordance with an embodiment of the present invention.
Figure 9:
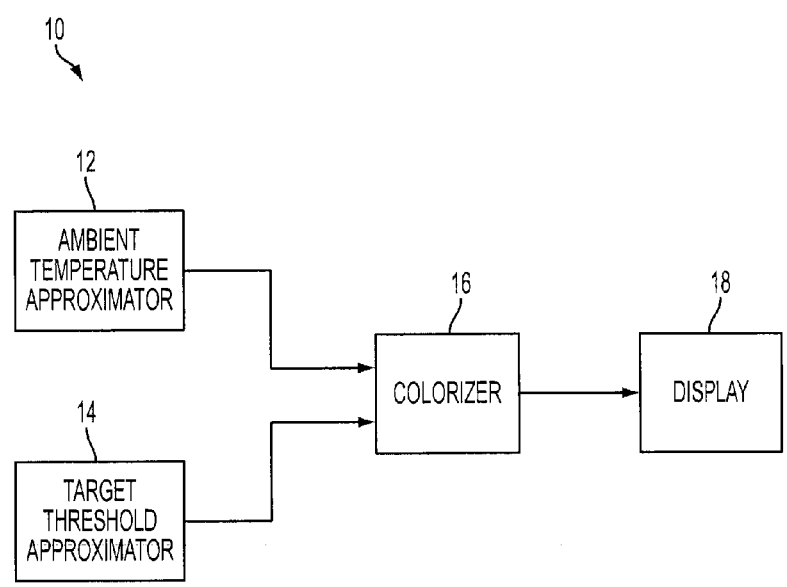
FIG. 9 is a block diagram of system 10 including ambient temperature approximator 12, target threshold approximator 14, colorizer 16 and display 18, in accordance with an embodiment of the present invention.

FIGS. 6b and 6c show plots of the first derivative of the image histogram and the second derivative of the image histogram, respectively. The same information may be seen in FIG. 7 on a different scale. With the scale enlarged, the upper and lower bounds placed on the first and second derivatives for selecting a threshold may be seen more easily. Note where the different conditions of one embodiment are satisfied to select a valid threshold. Thus, the threshold is set above the minimum threshold value; the first derivative is within the $[d_{min},d_{max}]$ bounds; and the second derivative is within the $[g_{min},g_{max}]$ bounds.

Limit and Infinite Impulse Response Filter, $\tau_{hist}$

Changes in the image histogram and its derivatives typically happen at a rapid rate. Two techniques are employed by the present invention in an effort to reduce the impact these changes have on $\tau_{hist}$. The first technique limits the amount that $\tau_{hist}$ may change from frame to frame. The pseudo-code describing this technique is shown in FIG. 8a. In essence, the technique is a smoothing technique, which limits the change in $\tau_{hist}$. The equation used in the pseudo-code and its related variables are shown below:

$$\Delta\tau_{hist} = \tau_{hist_{new}} - \tau_{hist_{old}} \quad (15a)$$

where:

$\tau_{hist}'$ is a step limited histogram threshold value, $\Delta\tau_{hist}$ is a difference between the filtered $\tau_{hist}$ value from a previous frame and the unfiltered $\tau_{hist}$ value from the current frame, $\tau_{hist_{new}}$ is a histogram threshold value from the current frame, $\tau_{hist_{old}}$ is an infinite impulse response (IIR) filtered histogram threshold value from the previous frame, and $\Delta\tau_{hist_{max}}$ is a maximum allowable change in $\tau_{hist}$ from frame to frame.

The second technique employs an infinite impulse response (IIR) filter to slow the response of $\tau_{hist}$ to any changes. The IIR filter uses two coefficient parameters in the same manner as the IIR filter in the ambient temperature approximation algorithm. One of the filters is used to form a slow response and the other to form a long response. A short coefficient is implemented when the ambient temperature approximation is considered to be "unstable", and a long coefficient is implemented when the ambient temperature approximation is considered to be "stable." A cue for changing between coefficients is taken directly from the ambient temperature approximation algorithm. The IIR filtering pseudo-code is shown in FIG. 8b. Its associated equation is reproduced below, along with definitions of related variables:

$$\tau_{hist} = (1-\alpha_{hist})\cdot\tau_{hist}' + (\alpha_{hist})\cdot\tau_{hist_{old}} \quad (15b)$$

where:

$\alpha_{hist_{SHORT}}$ is a short IIR filter coefficient, $\alpha_{hist_{LONG}}$ is a long IIR filter coefficient, $\alpha_{hist}$ is an IIR filter coefficient used, $\tau_{hist}$ is a final histogram threshold value, $\tau_{hist}'$ is a step limited histogram threshold value, and $\tau_{hist_{old}}$ is a histogram threshold value from the frame.

When processing in real-time, a number of values used in these calculations may be unknown until a full frame is processed. In such a situation, values used in the aforementioned equations may be taken from the previous frame.

Modified K-means Approach

The second threshold method, or the modified K-means approach, is derived by the present invention from an iterative method that determines a threshold between two classes in an image. The modified K-means approach uses a subset of data, $\tilde{s}$, as defined by Equation 16 below:

$$\tilde{s} \in p \,|\, (\mu_{ambient} - \alpha_3 \cdot MAD'_{middle}) \le p < (\mu_{ambient} + \Delta k_{max}) \quad (16)$$

where:

$\tilde{s}$ is a subset of raw LWIR data used in the modified K-means approach, $\alpha_3$ is a scale factor, and $\Delta k_{max}$ is an offset parameter used to define the upper limit of $\tilde{s}$.

Initially, within this subset of $\tilde{s}$, two classes are assumed to exist in every image frame: a target class and a background class. The two classes in the data subset are separated using an initial threshold value, $\tau_{init.}$. Equations 17a and 17b demonstrate how the two classes may be separated, as follows:

$$c_1 \in \tilde{s} \,|\, \tilde{s} < \tau_{init.} \quad (17a)$$

$$c_2 \in \tilde{s} \,|\, \tilde{s} \ge \tau_{init.} \quad (17b)$$

where:

$\tau_{init.}$ is an initial threshold value to separate the two classes, $c_1$ is class 1 (assumed a background class), and $c_2$ is class 2 (assumed a target class).

If no pixels fall into either class $c_1$ or $c_2$, an alternative approach may be used to determine $\mu_1$ or $\mu_2$. That is, the value for the empty class is taken to be the value of $\tau_{init.}$. Otherwise, the value of $\mu_1$ or $\mu_2$ is the mean of the respective class.

Once each class has been separated, the mean of each class is computed. Next, a new threshold, $\tau_{new}$, is computed by taking the weighted average of the mean values of each class, as shown in Equation 18. This new threshold value is passed on to the next frame, for use in the initial separation of classes. When processing the first frame, $\tau_{init.}$ is set equal to $\tau_{min.}$. For all other frames, the $\tau_{init.}$ is set equal to $\tau_{new}$ from the prior frame.

$$\tau_{new} = \rho \cdot \mu_1 + (1-\rho) \cdot \mu_2 \quad (18)$$

where:

$\mu_1$ is the mean of class 1, $\mu_2$ is the mean of class 2, $\rho$ is a fraction of $\mu_1$ contributing to $\tau_{new}$, and $\tau_{new}$ is the new threshold value between $c_1$ and $c_2$.

After $\tau_{new}$ is computed, a test is performed by the present invention to determine if a target actually exists. Since the distribution of temperatures associated with the human body usually has a greater variance than the variance of different background clutter classes, the test is based on the spread of the LWIR image data. Thus, a subset of data, $p_{hot}$, that exists above $\tau_{new}$ is considered for this test. The spread of the data may be determined using a MAD calculation shown in Equation 19 below:

$$MAD_{hot} = \frac{\sum_{i=1}^{P_{hot_{total}}} |\mu_{hot} - p_{hot_i}|}{P_{hot_{total}}} \quad (19)$$

where:

$MAD_{hot}$—MAD value of the $p_{hot}$ data $\mu_{hot}$—mean value of $p_{hot}$ $p_{hot_i}$—$i^{th}$ pixel value of $p_{hot}$ $p_{hot_{total}}$—total number of pixels in $p_{hot}$ $p_{hot} \in p \,|\, \tau_{new} < p < (\mu_{ambient} + P_{hot_{max}})$ and $P_{hot_{max}}$ is an offset defining an upper bound on $p_{hot}$.

Once $MAD_{hot}$ is calculated, it is compared to a parameter $MAD_{thresh}$ in order to determine if a target is present. If $MAD_{hot}$ is greater than $MAD_{thresh}$ then a target is assumed to exist, because the spread of the data is large enough to indicate the presence of a hot target. In such case, the modified K-means target threshold of $\tau_{kmeans}$ is set to the value of $\tau_{new}$.

If $MAD_{hot}$ is less than $MAD_{thresh}$, however, it is assumed that a target is not present, because the spread of the data is too narrow. If a target is not present, then the target threshold of $\tau_{kmeans}$ is not set to $\tau_{new}$, as this would cause false colorization of the background clutter in the scene. Instead, the threshold is pushed further from the ambient temperature to ensure that nothing in the scene is falsely colorized. The pseudo-code that explains these conditions is shown in FIG. 8c. In addition, the variables used in the pseudo-code are listed below:

$MAD_{thresh}$ is a threshold value for the spread of the $p_{hot}$ data, $\tau_{min}$ is the minimum allowable threshold, and $\tau_{kmeans_{new}}$ is the unfiltered threshold from the modified K-means approach.

It will be appreciated that the computed threshold is limited to at least $\tau_{min}$.

It will also be appreciated that in a case where $P_{hot_{total}} = 0$, then the subset of $p_{hot}$ is empty. In such case, the MAD calculation yields a value, $MAD_{hot} = 0$. This result indicates that the spread of data in the target region is too narrow.

Infinite Impulse Response Filter for $\tau_{kmeans}$

In an effort to reduce the sensitivity of $\tau_{kmeans}$ to rapid changes in scene content, an IIR filter is applied by the present invention. The IIR filter uses the same approach as the filter for $\tau_{hist}$. It uses two filters, one to form a slow response and another to form a long response. A short coefficient is implemented when the ambient temperature approximation is considered "unstable", and a long coefficient is implemented when the ambient temperature approximation is considered "stable". Again, the cue to change between coefficients is taken directly from the ambient temperature approximation algorithm. The pseudo-code for changing between the long coefficient and the short coefficient is shown in FIG. 8*d*. Equation 20 computes the final modified K-means target threshold value, $\tau_{kmeans}$, as follows:

$$\tau_{kmeans} = (1-\alpha_{kmeans}) \cdot \tau_{kmeans_{new}} + (\alpha_{kmeans}) \cdot \tau_{kmeans_{old}} \quad (20)$$

where:

$\alpha_{kmeans_{SHORT}}$ is the short IIR filter coefficient, $\alpha_{kmeans_{LONG}}$ is the long IIR filter coefficient, $\alpha_{kmeans}$ is the IIR filter coefficient used, $\tau_{kmeans}$ is the final modified K-means target threshold value, $\tau_{kmeans_{new}}$ is the unfiltered modified K-means threshold value from the current frame, and $\tau_{kmeans_{old}}$ is the filtered modified K-means threshold value.

Because of the number of values used in these calculations that are unknown until a full frame is processed, many of the parameters used in the aforementioned equations are taken from the previous frame.

Combining $\tau_{hist}$ and $\tau_{kmeans}$

The thresholds, $\tau_{kmeans}$ and $\tau_{hist}$, each perform well under different circumstances, but also tend to have difficulties with some scene content. In order to produce a threshold that is more effective across all scene types, a weighted combination of the two thresholds is used by one embodiment of the present invention. Other embodiments do not combine the thresholds.

When combined, the final threshold value, $\tau_{hot}$, is given by Equation 21 shown below. Since both threshold approaches utilized IIR filters, the final threshold value does not require a separate IIR filter.

$$\tau_{hot} = (f) \cdot \tau_{kmeans} + (1-f) \cdot \tau_{hist} \quad (21)$$

where:

$\tau_{hot}$ is the final threshold used to separate hot targets from the background, $\tau_{kmeans}$ is the modified K-means target threshold value, $\tau_{hist}$ is the histogram approach target threshold value, and $f$ is a fraction of $\tau_{kmeans}$ to use by the invention.

Table 2 presents a list of variables used in computing the modified k-means target threshold value.

TABLE 2

List of Variables used in computing the modified K-means target threshold value.

| Variable | Name | Units |
|---|---|---|
| $a_{11}$ | MAD'$_{frame}$ low scale factor | scalar |
| $a_{12}$ | MAD'$_{frame}$ high scale factor | scalar |
| midstep$_{down_{max}}$ | maximum offset for lower bound on $\hat{p}$ | counts |
| midstep$_{up_{max}}$ | maximum offset for upper bound on $\hat{p}$ | counts |
| $\Delta\tau_{min_{low}}$ | offset defining lower bound on $\tau_{min}$ | counts |
| $\Delta\tau_{min_{high}}$ | offset defining upper bound on $\tau_{min}$ | counts |
| $a_2$ | MAD'$_{middle}$ scale factor used to define $\tau_{min}$ | scalar |
| $\Delta h_{high}$ | high offset to define subset, s | counts |
| $b_{width} - 1$ | Histogram bin width | counts |
| $d_{min}$ | lower bound condition for selecting $\tau_{hist}$ from 1$^{st}$ derivative | scalar |
| $d_{max}$ | upper bound condition for selecting $\tau_{hist}$ from 1$^{st}$ derivative | scalar |
| $g_{min}$ | lower bound condition for selecting $\tau_{hist}$ from 2$^{nd}$ derivative | scalar |
| $g_{max}$ | upper bound condition for selecting $\tau_{hist}$ from 2$^{nd}$ derivative | scalar |
| $\Delta\tau_{hist_{max}}$ | maximum allowable change in $\tau_{hist}$ between consecutive frames | counts |
| $\alpha_{hist_{LONG}}$ | IIR Filter Coefficient for $\tau_{hist}$ (long response) | scalar |
| $\alpha_{hist_{SHORT}}$ | IIR Filter Coefficient for $\tau_{hist}$ (short response) | scalar |
| $a_3$ | MAD'$_{middle}$ scale factor used to help define the subset, $\tilde{s}$ | scalar |
| $\Delta\kappa_{max}$ | high offset to define subset, $\tilde{s}$ | counts |
| $\rho$ | fraction of $\mu_1$ to use in Modified K-means approach | scalar |
| $p_{hot_{max}}$ | offset defining upper bound on $p_{hot}$ | counts |
| MAD$_{thresh}$ | threshold value for the spread of the $p_{hot}$ data | counts |
| $\alpha_{kmeans_{LONG}}$ | IIR Filter Coefficient for $\tau_{kmeans}$ (long response) | scalar |
| $\alpha_{kmeans_{SHORT}}$ | IIR Filter Coefficient for $\tau_{kmeans}$ (short response) | scalar |
| $f$ | Fraction of $\tau_{kmeans}$ to contribute to $\tau$ | scalar |

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for extracting a target from a series of images comprising the steps of:
    (a) estimating an ambient temperature value of pixels in the series of images;
    (b) finding a band of pixel values having temperature values above the ambient temperature value, the band of pixel values forming a histogram;
    (c) differentiating the histogram to estimate a threshold;
    (d) extracting the target having pixel values above the threshold; and
    (e) colorizing the target for display;
    wherein step (c) includes
    computing a first derivative of the histogram,
    computing a second derivative of the histogram; and
    forming the threshold based on boundaries set for the first and second derivatives.

2. The method of claim 1 wherein step (a) includes
    forming a first subset of pixel values of a current image defining a window of pixel values having a predetermined temperature variation; and
    computing the ambient temperature value of the first subset of pixel values of the current image.

3. The method of claim 2 including the step of:
    filtering the computed ambient temperature value, based on a previously computed ambient temperature value of a subset of pixel values belonging to a previous image.

4. The method of claim 1 wherein step (b) includes
    finding a minimum threshold value above the ambient temperature value; and selecting a second subset of pixel values of a current image having values above the minimum threshold value, the second subset of pixel values forming the histogram.

5. The method of claim 1 including the step of:
filtering the first threshold, based on a previously formed threshold belonging to a previous image.

6. A method for extracting a target from a series of images comprising the steps of:
   (a) estimating an ambient temperature value of pixels in the series of images;
   (b) forming a band of pixel values of a current image, the band comprising an amount of pixels less than an amount of pixels in an image;
   (c) clustering the band of pixel values into a target class and a background class;
   (d) extracting the target having pixel values above the new threshold value; and
   (e) colorizing the target for display;
   wherein step (c) includes
   setting an initial threshold value in the band of pixel values for separating the target class from the background class, and
   computing a mean value of the target class and a mean value of the background class, and
   setting a new threshold value based on the two computed mean values.

7. The method of claim 6 wherein step (a) includes
forming a first subset of pixel values of a current image defining a window of pixel values having a predetermined temperature variation; and
computing the ambient temperature value of the first subset of pixel values of the current image.

8. The method of claim 7 wherein step (a) includes
filtering the estimated ambient temperature value, based on a previously estimated ambient temperature value of a subset of pixel values belonging to a previous image.

9. The method of claim 6 wherein step (b) includes
forming the band of pixel values ranging below the ambient temperature value by a first amount and above the ambient temperature value by a second amount,
wherein the first amount is different from the second amount.

10. The method of claim 6 wherein step (d) includes
estimating a distribution value of the target class, and
if the distribution value is above a predetermined value, then the target is determined to exist.

11. The method of claim 6 wherein step (d) includes
filtering the threshold value of a current image based on a threshold value of a previous image.

12. A method for extracting a target from a series of images comprising the steps of:
   (a) estimating an ambient temperature value of pixels in the series of images;
   (b) finding a first band of pixel values of a current image having temperature values above the ambient temperature value, the first band of pixel values forming a histogram;
   (c) smoothing the histogram to estimate a first threshold;
   (d) forming a second band of pixel values of the current image;
   (e) clustering the second band of pixel values into a target class and a background class;
   (f) computing a second threshold value between the target class and the background class;
   (g) extracting the target based on the first and second thresholds; and
   (h) colorizing the target for display;
   wherein step (c) includes
   computing a first derivative of the histogram;
   computing a second derivative of the histogram; and
   forming the first threshold based on boundaries set for the first and second derivatives.

13. The method of claim 12 wherein step (g) includes
combining the first and second thresholds, using a weighted average, to form a third threshold, and
extracting the target using the third threshold.

14. The method of claim 12 wherein step (e) includes
setting an initial threshold value in the second band of pixel values for separating the target class from the background class; and
computing a mean value of the target class and a mean value of the background class; and
step (f) includes
setting the second threshold value based on the computed mean values.

15. The method of claim 12 wherein step (a) includes
forming a subset of pixel values of a current image defining a window of pixel values having a predetermined temperature variation; and
computing the ambient temperature value of the subset of pixel values of the current image.

16. The method of claim 12 including the steps of:
   (i) filtering the first and second threshold values of a current image based on first and second threshold values, respectively, of a previous image;
   (j) forming a first subset of pixel values of a current image defining a window of pixel values having a predetermined temperature variation; and
   (k) computing the ambient temperature value of the first subset of pixel values of the current image.

* * * * *